United States Patent
Hwang et al.

(10) Patent No.: US 8,280,320 B2
(45) Date of Patent: Oct. 2, 2012

(54) APPARATUS AND METHOD FOR SUPPORTING MULTIPLE-INPUT MULTIPLE-OUTPUT AND BEAMFORMING SIMULTANEOUSLY IN WIRELESS COMMUNICATION SYSTEM

(75) Inventors: Ki-Hwan Hwang, Seoul (KR); Myung-Kwang Byun, Suwon-si (KR); Sung-Kwon Jo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 406 days.

(21) Appl. No.: 12/708,926

(22) Filed: Feb. 19, 2010

(65) Prior Publication Data
US 2010/0210227 A1     Aug. 19, 2010

(30) Foreign Application Priority Data
Feb. 19, 2009 (KR) .................. 10-2009-0013750

(51) Int. Cl.
H03C 7/02 (2006.01)
H04B 1/02 (2006.01)
H04B 7/02 (2006.01)

(52) U.S. Cl. .......... 455/101; 455/91; 455/103; 455/104; 455/561; 375/295; 375/299; 375/267

(58) Field of Classification Search ............... 455/91, 455/101, 103, 104, 114.2, 115.1, 119, 500, 455/524, 525, 561; 375/295, 299, 267
See application file for complete search history.

(56) References Cited

U.S. PATENT DOCUMENTS

| | | |
|---|---|---|
| 2003/0026348 A1 | 2/2003 | Llang et al. |
| 2008/0144733 A1* | 6/2008 | ElGamal et al. ............. 375/267 |
| 2008/0144738 A1 | 6/2008 | Naguib |
| 2008/0181191 A1* | 7/2008 | Hillery et al. ................ 370/339 |
| 2008/0205539 A1* | 8/2008 | Wang et al. ................... 375/267 |
| 2008/0287075 A1 | 11/2008 | Kim et al. |

FOREIGN PATENT DOCUMENTS
EP    1 381 172    1/2004
* cited by examiner

Primary Examiner — Tuan Pham
(74) Attorney, Agent, or Firm — The Farrell Law Firm, P.C.

(57) ABSTRACT

An apparatus and a method for simultaneously supporting Multiple-Input Multiple-Output (MIMO) and beamforming in a wireless communication system are provided. In the method, two data streams are mapped to each of all of 2N transmission antennas; the two data streams are multiplied by different Cyclic Delay Diversity (CDD) phase sequences; the two data streams multiplied by the different CDD phase sequences for each transmission antenna are added; and the added data stream is multiplied by a beamforming coefficient and transmitted for each transmission antenna.

14 Claims, 4 Drawing Sheets

APPARATUS AND METHOD FOR SUPPORTING MULTIPLE-INPUT MULTIPLE-OUTPUT AND BEAMFORMING SIMULTANEOUSLY IN WIRELESS COMMUNICATION SYSTEM

PRIORITY

This application claims priority under 35 U.S.C. §119(a) to a Korean patent application filed in the Korean Intellectual Property Office on Feb. 19, 2009 and assigned Serial No. 10-2009-0013750, the entire disclosure of which is hereby incorporated by reference.

BACKGROUND OF THE INVENTION

1. Field of the Invention

The present invention relates to an apparatus and a method for simultaneously supporting a Multiple-Input Multiple-Output (MIMO) and beamforming in a wireless communication system. More particularly, the present invention relates to an apparatus and a method for transmitting a data stream using an improved Space-Time Coding (STC) and Beam-Forming (BF) technique.

2. Description of the Related Art

With the rapid development of the wireless communication market, providing various multimedia services under a wireless environment is required. Recently, as greater capacity of transmission data and higher speed in data transmission are supported in order to provide such multimedia services, extensive research is being conducted in a multiple antenna scheme capable of efficiently using the limited frequency bands.

A wireless communication scheme may be divided into a Single-Input Single-Output (SISO) scheme and an MIMO scheme depending on the number of antennas used during transmission/reception. The SISO scheme performs transmission/reception via one antenna, and the MIMO scheme performs transmission/reception via a plurality of antennas. The MIMO scheme may be roughly divided into three techniques: a transmit diversity technique (referred to as a 'Space-Time Coding (STC) technique' hereinafter) that can obtain a diversity gain using a plurality of space paths formed by a plurality of antennas; a spatial multiplexing technique that can obtain a multiplexing gain by simultaneously transmitting a plurality of data via a plurality of antennas; and, a BeamForming (BF) technique that can gain an array gain by forming a beam suitable for a channel using a plurality of antennas and performing transmission.

The BF technique forms a beam in the direction of each terminal by multiplying a transmission signal transmitted to each terminal by a specific beamforming coefficient, and transmitting the same via a plurality of antennas. When the BF technique is applied to a system, a reception Signal to Noise Ratio (SNR) of a terminal increases and a fading influence by a wireless channel reduces, so that a reception performance of the system can be improved. However, to apply the BF technique and achieve the best performance improvement, a beamforming coefficient and a transmission channel need to match, and when an error between a beamforming coefficient and a transmission channel occurs, any gain that may be obtained by the BF technique drastically reduces. More particularly, in the case where a velocity of a terminal is high in an actual operation, when the BF technique is applied to a system, an error between a beamforming coefficient and a transmission channel increases even more and thus it is difficult to expect any improvement in system performance.

By combining the BF technique with at least one other technique, such as the SISO scheme, the STC technique, or the spatial multiplexing technique, a new type of BF technique may be applied to the system. For example, a Single-Input Single-Output and BeamForming (SISO BF) technique which combines the SISO scheme with the BF technique, a Space-Time Coding and BeamForming (STC BF) technique which combines the STC technique with the BF technique, etc. may be applied to the system. A method for determining a beamforming coefficient may differ depending on an antenna shape of each technique.

Assuming a four transmission antennas example, a system that applies the conventional STC BF technique has a (2+2)-structure. The (2+2)-structure denotes a structure that transmits a first data stream of two data streams via antennas 1 and 2, and transmits a second data stream via antennas 3 and 4. A structure of a system that applies the STC BF technique is not simply generalized using N transmission antennas, that is, the structure is not generalized as an (N+N)-structure. Therefore, an STC BF technique having a structure that can be simply generalized using N transmission antennas is required.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for simultaneously supporting MIMO and beamforming in a wireless communication system.

Another aspect of the present invention is to provide an apparatus and a method for transmitting a data stream using an improved STC BF technique that is generalized in an (N+N) structure from a (2+2) structure of the conventional STC BF technique in a wireless communication system.

Still another aspect of the present invention is to provide an efficient beamforming apparatus and a method thereof, that do not deteriorate in performance even under a mobile channel environment by variably selecting an antenna transmission method and variably applying a beamforming coefficient depending on a velocity of a terminal in a wireless communication system.

In accordance with an aspect of the present invention, a transmission method of a base station is provided. The method includes mapping two data streams to each of all of 2N transmission antennas, multiplying the two data streams by different Cyclic Delay Diversity (CDD) phase sequences, adding the two data streams multiplied by the different CDD phase sequences for each transmission antenna, and multiplying the added data stream by a beamforming coefficient and transmitting the same for each transmission antenna.

In accordance with another aspect of the present invention, a transmission apparatus of a base station is provided. The apparatus includes a scheduler for mapping two data streams to each of all of 2N transmission antennas, a Cyclic Delay Diversity (CDD) phase sequence multiplier for multiplying the two data streams by different CDD phase sequences, an adder for each transmission antenna, for adding the two data streams multiplied by the different CDD phase sequences for each transmission antenna, and a beamforming coefficient multiplier for each transmission antenna, for multiplying the added data stream by a beamforming coefficient and transmitting the same for each transmission antenna.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain embodiments of the present invention will be more apparent from the following description taken in conjunction with the accompanying drawings in which.

Throughout the drawings, like reference numerals will be understood to refer to like parts, components and structures.

DETAILED DESCRIPTION OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their dictionary meanings, but are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

Embodiments of the present invention provide an (N+N)-structure of an STC BF technique, and an alternative for variably selecting an antenna transmission method and variably applying a beamforming coefficient depending on a velocity of a terminal in a wireless communication system.

Though the present invention is described using an STC BF technique, which is a combination of an STC technique and a beamforming technique, as an example, the present invention is applicable to a technique of all combinations where a MIMO technique and a beamforming technique are combined.

In the following, description is made using the case where a base station has N transmission antennas and transmits two data streams via the N transmission antennas, as an example, and is applicable to the case of transmitting a plurality of two or more data streams via the N transmission antennas.

Figure 1:
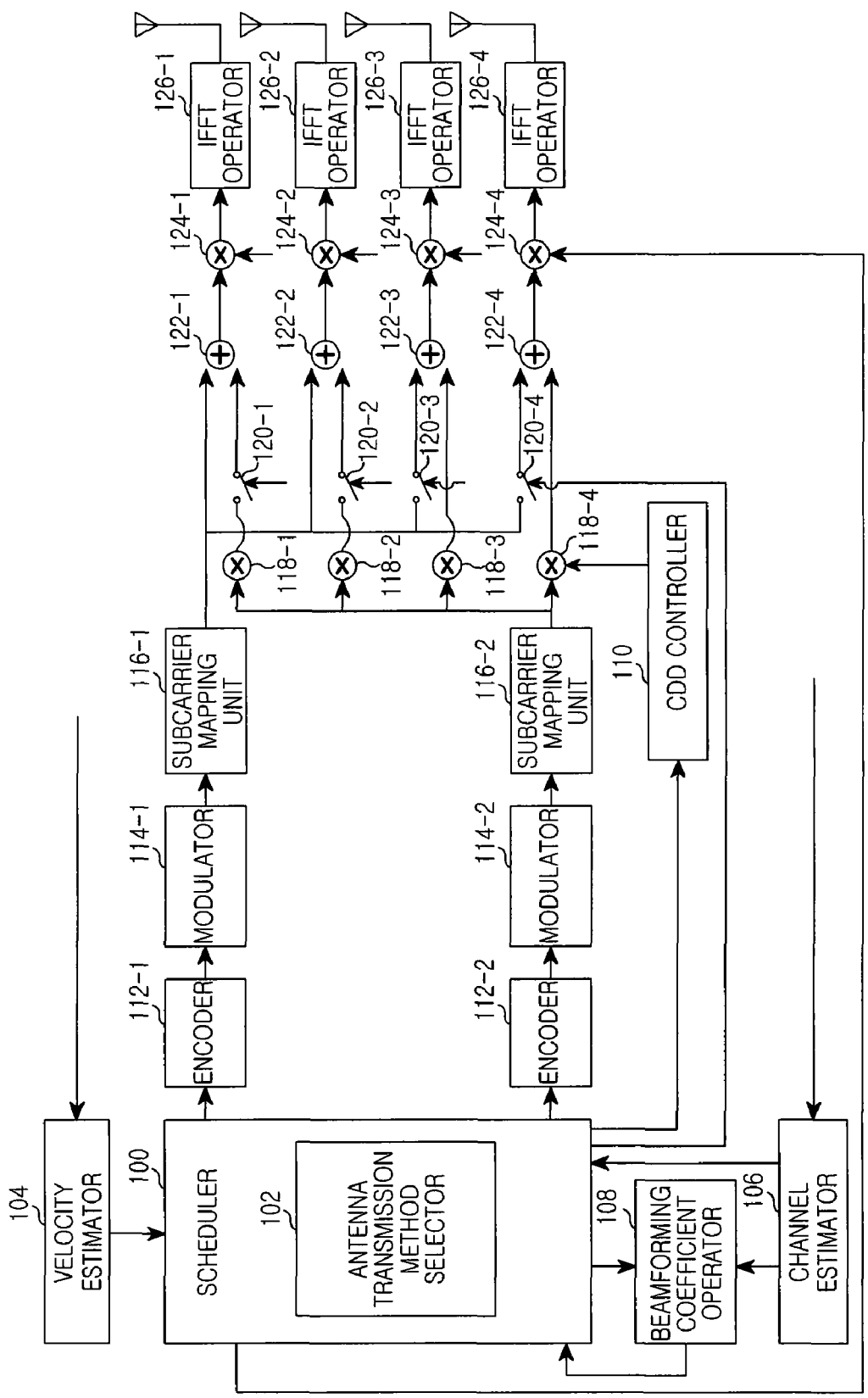
FIG. 1 is a block diagram illustrating an apparatus of a base station in a wireless communication system according to an embodiment of the present invention.

FIG. 1 is a block diagram illustrating an apparatus of a base station in a wireless communication system according to an embodiment of the present invention.

Referring to FIG. 1, the base station includes a scheduler 100, a velocity estimator 104, a channel estimator 106, a beamforming coefficient operator 108, a CDD controller 110, encoders 112-1 and 112-2, modulators 114-1 and 114-2, sub-carrier mapping units 116-1 and 116-2, CDD phase sequence multipliers 118-1, 118-2, 118-3, and 118-4, switches 120-1, 120-2, 120-3, and 120-4, adders 122-1, 122-2, 122-3, and 122-4, beamforming coefficient multipliers 124-1, 124-2, 124-3, and 124-4, and Inverse Fast Fourier Transform (IFFT) operators 126-1, 126-2, 126-3, and 126-4. Here, the scheduler 100 includes an antenna transmission method selector 102.

Referring to FIG. 1, the scheduler 100 determines data streams (for example, two data streams) to be transmitted at a current frame through scheduling, and provides the determined data streams to the encoders 112-1 and 112-2. Here, the scheduling may be performed using an estimated channel value provided from the channel estimator 106. The antenna transmission method selector 102 inside the scheduler 100 selects an antenna transmission method for the determined data streams while taking into consideration a reception environment of a terminal. For example, the antenna transmission method selector 102 selects an antenna transmission method for the determined data streams by comparing a velocity value of a terminal provided from the velocity estimator 104 with a first threshold and a second threshold, the second threshold being less than the first threshold. When the velocity of the terminal is high that is equal to or greater than the first threshold, the antenna transmission method selector 102 selects an STC technique that does not apply a beamforming technique as an antenna transmission method. When the velocity of the terminal is medium, that is less than the first threshold but greater than the second threshold, the antenna transmission method selector 102 selects the general STC BF (2+2) technique. When the velocity of the terminal is low, that is less than the second threshold, the antenna transmission method selector 102 selects an STC BF (4+4) technique proposed by an embodiment of the present invention. In addition, the antenna transmission method selector 102 provides the selected antenna transmission method to the beamforming coefficient operator 108, and receives a beamforming coefficient from the beamforming coefficient operator 108 to provide the same to the beamforming coefficient multipliers 124-1, 124-2, 124-3, and 124-4. In addition, the scheduler 100 controls the switches 120-1, 120-2, 120-3, and 120-4, and the CDD controller 110 depending on the selected antenna transmission method.

The velocity estimator 104 estimates a velocity of a terminal using an uplink signal of the terminal, and provides the estimated velocity of the terminal to the antenna transmission method selector 102 inside the scheduler 100. A representative method for estimating a velocity of the terminal estimates a Level Crossing Rate (LCR) using Channel Quality Indicator (CQI) information periodically reported by the terminal, and estimates a velocity based on the estimated LCR. Other velocity estimating techniques are contemplated.

The channel estimator 106 estimates an uplink channel by receiving a sounding signal transmitted by a terminal, and provides the estimated channel value to the scheduler 100 and the beamforming coefficient operator 108.

The beamforming coefficient operator 108 receives the selected antenna transmission method from the antenna transmission method selector 102 inside the scheduler 100, receives an estimated channel value from the channel estimator 106 to operate a beamforming coefficient, and provides the operated beamforming coefficient to the scheduler 100.

The CDD controller 110 provides a CDD phase sequence to the CDD phase sequence multipliers 118-1, 118-2, 118-3, and 118-4 in order to apply an STC technique to the selected data streams under control of the scheduler 100.

The encoders 112-1 and 112-2 encode input information data at a relevant encoding rate and output encoded data (coded bits or symbols). For example, the encoders 112-1 and 112-2 may be convolution coders, turbo coders, or Low Density Parity Check (LDPC) coders.

The modulators 114-1 and 114-2 perform signal point mapping on symbols from the connected encoders 112-1 and 112-2 according to a relevant modulation scheme (modulation level) and output complex symbols. Examples of the modulation scheme include Binary Phase Shift Keying (BPSK) which maps one bit (s=1) to one signal point (complex symbol), Quadrature Phase Shift Keying (QPSK) which maps two bits (s=2) to one complex symbol, 8-ary Phase Shift Keying (8PSK) which maps three bits (s=3) to one complex symbol, 16 Quadrature Amplitude Modulation (QAM) which maps four bits (s=4) to one complex symbol, and 64QAM which maps six bits (s=6) to one complex symbol.

The subcarrier mapping units 116-1 and 116-2 map output symbols from the connected modulators 114-1 and 114-2 to subcarriers, and output the same. Here, the mapping of the symbols to the subcarriers denotes providing data symbols to relevant inputs (subcarrier location) of the IFFT operators 126-1, 126-2, 126-3, and 126-4.

The number of CDD phase sequence multipliers 118-1, 118-2, 118-3, and 118-4 is equal to the number of transmission antennas, receive CDD phase sequences from the CDD controller 110, multiply output symbols from the subcarrier mapping unit 116-2 by the CDD phase sequences, and provide the result to the switches 120-1 and 120-2 corresponding to two antennas of the transmission antennas, and the adders 122-3 and 122-4 corresponding to the other two antennas of the transmission antennas.

The number of switches 120-1, 120-2, 120-3, and 120-4 is equal to the number of the transmission antennas, and two switches 120-1 and 120-2 are connected with the CDD phase sequence multipliers 118-1 and 118-2, respectively, and the other two switches 120-3 and 120-4 are connected to the subcarrier mapping unit 116-1, to switch output symbols from the connected CDD phase sequence multipliers 118-1 and 118-2, or the subcarrier mapping unit 116-1 to the connected adders 122-1, 122-2, 122-3, and 122-4 under control of the scheduler 100. That is, when the scheduler 100 selects an STC BF (2+2) technique as an antenna transmission method for the selected data streams, the scheduler 100 turns off the switches 120-1, 120-2, 120-3, and 120-4 so that the switches 120-1, 120-2, 120-3, and 120-4 do not switch output symbols from the connected CDD phase sequence multipliers 118-1 and 118-2, or the subcarrier mapping unit 116-1 to the connected adders 122-1, 122-2, 122-3, and 122-4. In addition, when the scheduler 100 selects an STC BF (4+4) technique of the embodiment of the present invention as an antenna transmission method for the selected data streams, the scheduler 100 turns on the switches 120-1, 120-2, 120-3, and 120-4 so that the switches 120-1, 120-2, 120-3, and 120-4 switch output symbols from the connected CDD phase sequence multipliers 118-1 and 118-2, or the subcarrier mapping unit 116-1 to the connected adders 122-1, 122-2, 122-3, and 122-4.

The number of adders 122-1, 122-2, 122-3, and 122-4 is equal to the number of the transmission antennas. Two adders 122-1 and 122-2 are connected with the subcarrier mapping unit 116-1 and the switches 120-1 and 120-2, respectively, and the other two adders 122-3 and 122-4 are connected with the switches 120-3 and 120-4, and the CDD phase sequence multipliers 118-3 and 118-4, respectively, to add one or more received output symbols, and then provide the same to the connected beamforming coefficient multipliers 124-1, 124-2, 124-3, and 124-4.

The number of beamforming coefficient multipliers 124-1, 124-2, 124-3, and 124-4 is equal to the number of the transmission antennas, and multiply output symbols from the connected adders 122-1, 122-2, 122-3, and 122-4 by beamforming coefficients, and provide the results to the connected IFFT operators 126-1, 126-2, 126-3, and 126-4 in order to apply a beamforming technique to the selected data streams under control of the scheduler 100.

The number of IFFT operators 126-1, 126-2, 126-3, and 126-4 is equal to the number of transmission antennas, and convert output symbols from the connected beamforming coefficient multipliers 124-1, 124-2, 124-3, and 124-4 to sample data in a time domain by performing IFFT on the output symbols. At this point, the sample data is Radio Frequency (RF)-processed so that it is actually transmittable, and is transmitted to a wireless channel via a connected transmission antenna.

Figure 2:
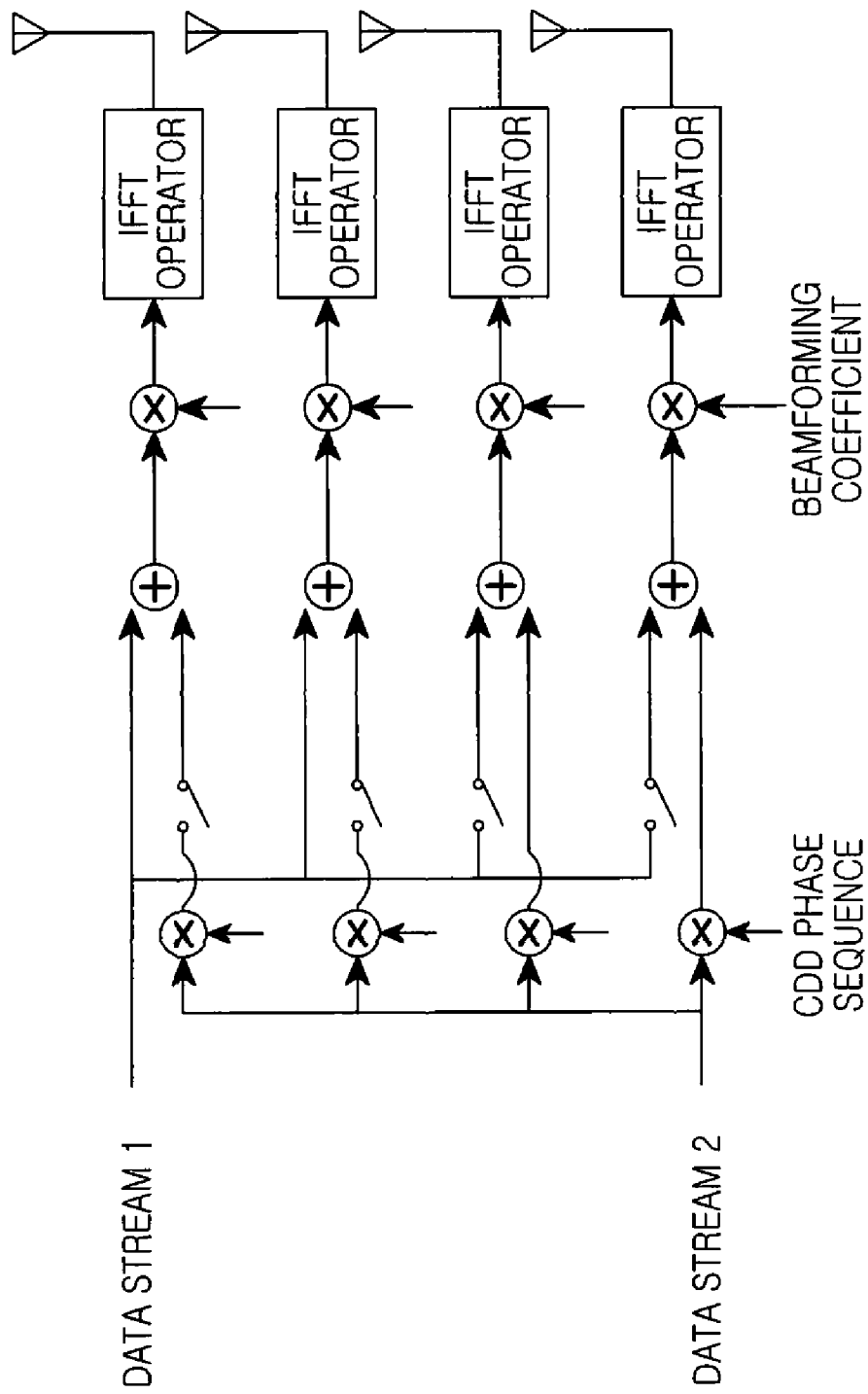
FIG. 2 is a diagram illustrating a (2+2)-structure of the conventional STC BF technique.

FIG. 2 is a diagram illustrating a (2+2)-structure of the conventional STC BF technique.

Referring to FIG. 2, all switches for respective transmission antennas are turned off, and therefore, beamforming is performed on a first data stream of two data streams and the first data stream is transmitted via antennas 1 and 2. Beamforming is performed on a second data stream and the second data stream is transmitted via antennas 3 and 4. At this point, CDD is applied to the second data stream transmitted via the antennas 3 and 4, that is, the second data stream is multiplied by a CDD phase sequence, and then transmitted. It is assumed that the same CDD phase sequence is applied. The first data stream may be multiplied by a CDD phase sequence that is different from the CDD phase sequence of the second data stream, and then transmitted. FIG. 2 illustrates an example where the first data stream is multiplied by a CDD phase sequence '0' and then transmitted.

Figure 3:
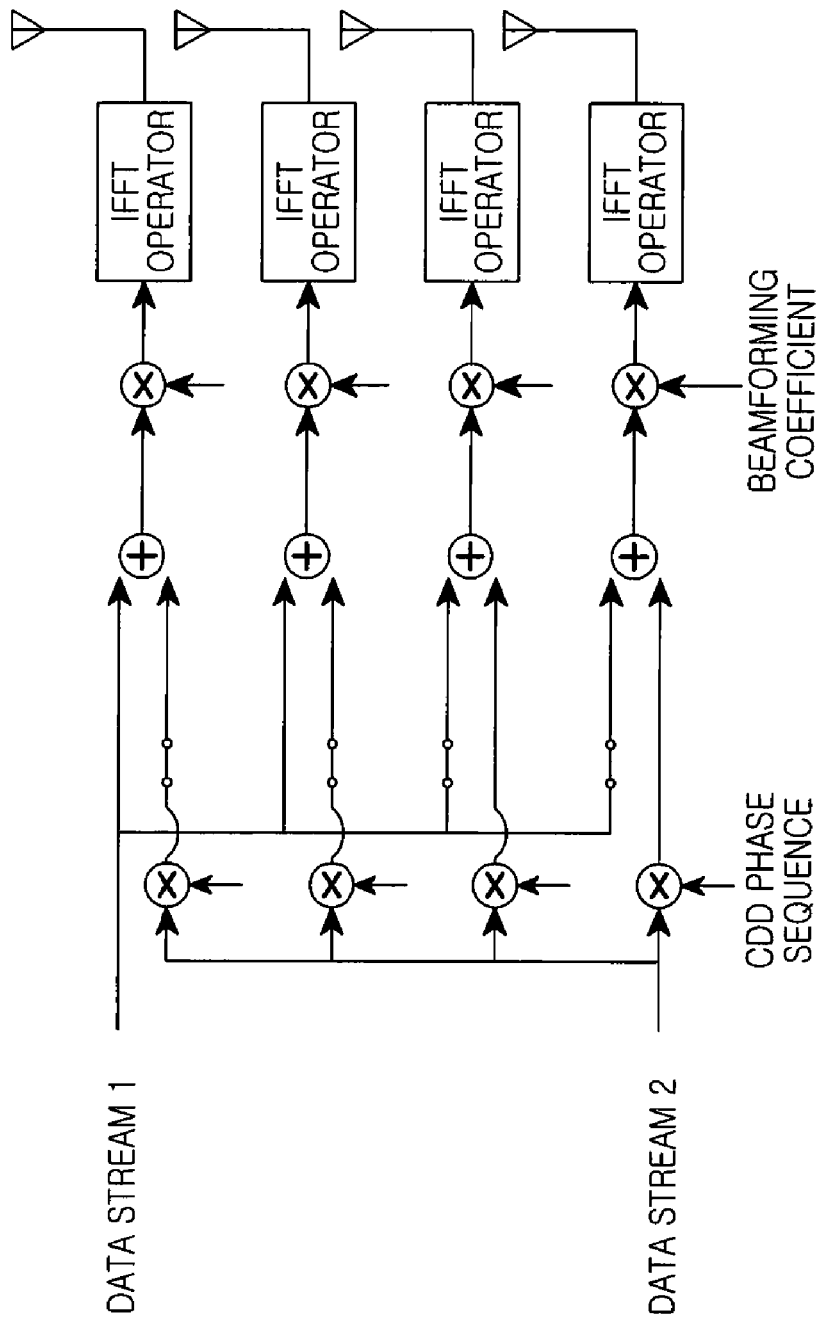
FIG. 3 is a diagram illustrating a (4+4)-structure of an STC BF technique proposed by an embodiment of the present invention.

FIG. 3 is a diagram illustrating a (4+4)-structure of an STC BF technique proposed by an embodiment of the present invention.

Referring to FIG. 3, all switches for respective transmission antennas are turned on, and therefore, beamforming is performed on two data streams, and the two data streams are transmitted via all four antennas. That is, beamforming is performed on a first data stream of the two data streams, and the first data stream is transmitted via antennas 1, 2, 3, and 4. Beam forming is performed on a second data stream, and the second data stream is transmitted via the antennas 1, 2, 3, and 4. CDD is applied to the second data stream, that is, the second data stream is multiplied by a CDD phase sequence and then transmitted. It is assumed that the same CDD phase sequence is applied. The first data stream may be multiplied by a CDD phase sequence that is different from the CDD phase sequence of the second data stream, and then transmitted. FIG. 3 illustrates an example where the first data stream is multiplied by a CDD phase sequence '0' and then transmitted.

When an (N+N) structure of an STC BF technique by the embodiment of the present invention is applied to a system, a reception signal of a 2-symbol section may be expressed by Equation (1).

$$[r_1 \ r_2] = [h_1 \ \ldots \ h_N] \cdot \begin{bmatrix} w_1 \\ \vdots \\ w_N \end{bmatrix} \cdot \frac{1}{\sqrt{2}} \begin{bmatrix} s_1 + s_2 \cdot e^{j\theta} & - \\ s_2^* + s_1^* \cdot e^{j\theta} & \end{bmatrix} + [n_1 \ n_2] \quad (1)$$

where $r_k$ is a reception symbol of a k-th symbol section, $h_n$ is a channel from an n-th transmission antenna, $w_n$ is a beamforming coefficient of an n-th transmission antenna, $s_k$ is a transmission symbol of a k-th symbol section, and $n_k$ is a noise of a k-th symbol section. Here, $e^{j\theta}$ corresponds to a CDD phase sequence multiplied to the second data stream by CDD.

Assuming a transmission Maximum Ratio Transmission (MRT) as a beamforming technique, the beamforming coefficient may be expressed by Equation (2).

$$w_n = \frac{h_n^*}{\sqrt{|h_1|^2 + |h_2|^2 + \ldots + |h_N|^2}}, n = 1, 2, \ldots, N \quad (2)$$

When Equation (2) is input into Equation (1), a reception signal may be expressed by Equation (3).

$$[r_1 \ r_2] = \begin{bmatrix} \sqrt{|h_1|^2 + |h_2|^2 + \ldots + |h_N|^2} \\ \sqrt{|h_1|^2 + |h_2|^2 + \ldots + |h_N|^2} \cdot e^{j\theta} \end{bmatrix} \quad (3)$$

$$\frac{1}{\sqrt{2}} \begin{bmatrix} s_1 & -s_2^* \\ s_2 & s_1^* \end{bmatrix} + [n_1 \ n_2]$$

Here, an output SNR of the reception signal may be expressed by Equation (4).

$$\gamma_{STC.BF(N+N)} = (|h_1|^2 + |h_2|^2 + \ldots + |h_N|^2) \cdot \gamma_{AWGN} \quad (4)$$

where $\gamma_{AWGN}$ is an Additive White Gaussian Noise (AWGN). This is the same as an output SNR that can be obtained when an SISO BF technique is applied to a system. When there is no influence of a channel estimation performance, the same performance can be obtained even when BF data that uses SISO N transmission antennas is transmitted using an STC BF (N+N) structure by the embodiment of the present invention.

In the case where a velocity of a terminal is fast in actual operation, when beamforming technique is applied to a system, an error between a beamforming coefficient and a transmission channel increases even more, and thus any gain achieved by the application of beamforming is reduced. In addition, beamforming application in the case where a velocity of a terminal is high, has no performance gain, or deteriorated performance.

More particularly, in the case where an antenna shape is collectively applied using a (4+4) structure or a (2+2) structure, performance deterioration depending on a reception environment of a terminal increases even more. Analysis of a beamforming performance using a velocity of a terminal shows that the (4+4) structure has an excellent performance at a low velocity but the (2+2) structure has an excellent performance at a medium velocity, and the beamforming performance deteriorates at a high velocity compared to a performance when the beamforming has not been applied. As described above, when one scheme is used regardless of a reception environment of a terminal, performance deterioration may occur.

Therefore, embodiments of the present invention provide an alternative for allowing a base station to estimate a velocity of a terminal, and determine an antenna transmission method and a beamforming coefficient suitable for the estimated velocity.

An antenna transmission method that provides best performance under an ideal environment where a beamforming coefficient and an actual channel perfectly match is an STC BF (4+4 structure) technique provided by the embodiment of the present invention. Since the STC BF (4+4 structure) technique has a shape as if data streams passed through the same channel for each transmission antenna, signals of respective transmission antennas are accumulative, so that a large array gain may be obtained. In actual operation, to apply the STC BF (4+4 structure) technique and obtain a performance gain, a velocity of a terminal should be a low velocity and a channel estimation performance should be the same.

The STC BF (2+2 structure) does not have a large array gain but transmits a first data stream via antennas 1 and 2, and a second data stream via antennas 3 and 4 differently, so that when a velocity of a terminal is greater than a predetermined velocity, a diversity gain may be obtained. Therefore, when a velocity is greater than a specific threshold, the STC BF (2+2 structure) technique is applied.

In the case where a velocity of a terminal is a high velocity, a channel estimation error caused by inaccuracy in channel estimation of the terminal and a processing delay of a base station increases, and in addition, an estimation error of a beamforming coefficient increases. In this case, a performance improvement by the beamforming technique cannot be expected. Therefore, when a velocity of a terminal is a high velocity, greater than a specific threshold, the beamforming technique is not applied.

Figure 4:
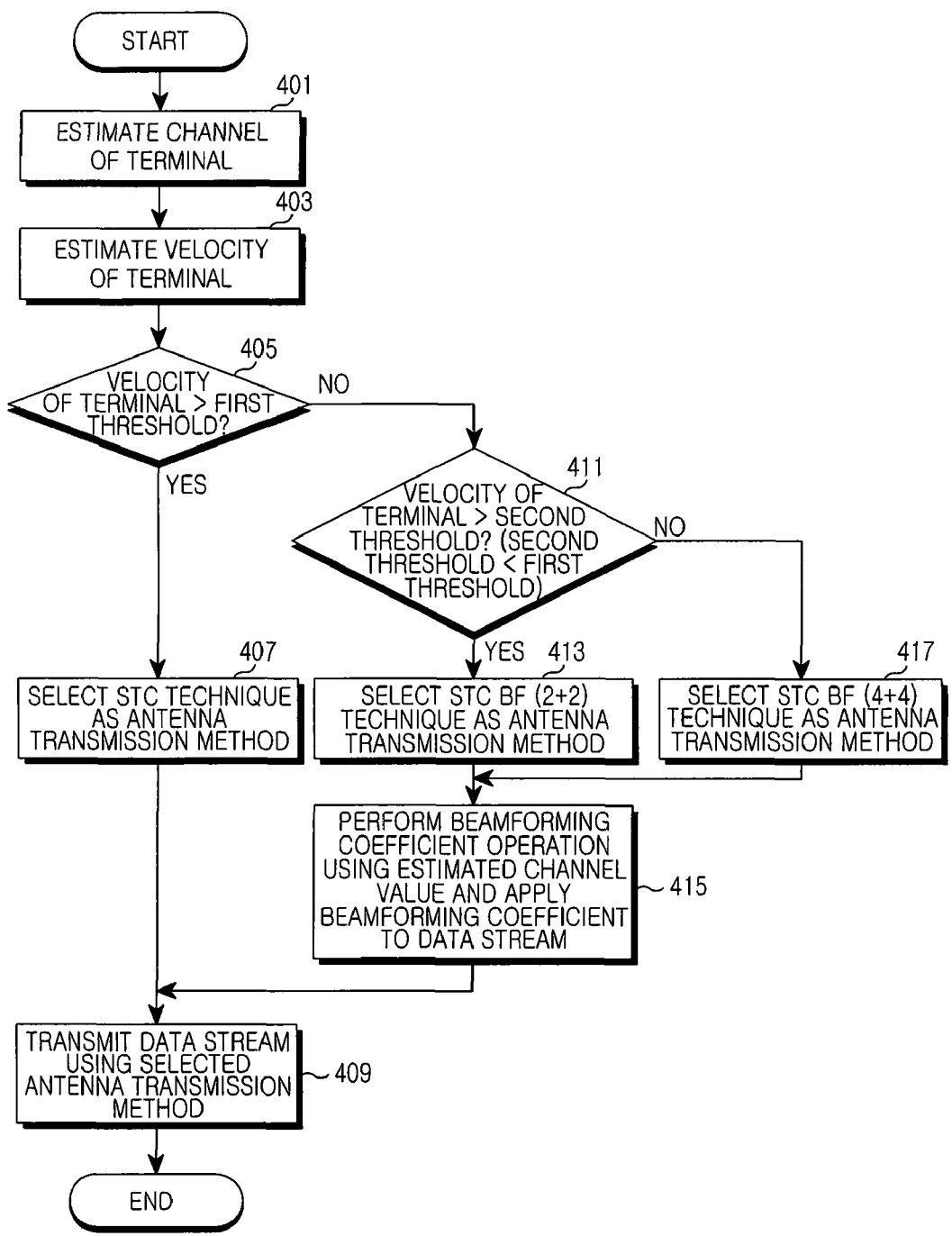
FIG. 4 is a flowchart illustrating a method for allowing a base station to variably select an antenna transmission method and variably apply a beamforming coefficient depending on a velocity of a terminal in a wireless communication system according to an embodiment of the present invention.

FIG. 4 is a flowchart illustrating a method for allowing a base station to variably select an antenna transmission method and variably apply a beamforming coefficient depending on a velocity of a terminal in a wireless communication system according to an embodiment of the present invention.

Referring to FIG. 4, the base station receives a sounding signal transmitted by the terminal to estimate an uplink channel, thereby estimated channel value in step 401.

The base station estimates a velocity of the terminal using an uplink signal of the terminal, thereby obtaining a velocity value of the terminal in step 403.

The base station compares the obtained velocity value of the terminal with a first threshold, and determines whether the velocity of the terminal is greater than the first threshold in step 405.

When the velocity of the terminal is greater than the first threshold in step 405, the base station selects a technique that does not apply the beamforming technique as an antenna transmission method, for example, selects an STC technique in step 407, and transmits a data stream using the selected antenna transmission method in step 409.

In contrast, when the velocity of the terminal is not greater than the first threshold in step 405, the base station determines whether the velocity of the terminal is greater than a second threshold in step 411. Here, the second threshold is set to a value less than the first threshold.

When the velocity of the terminal is not greater than the first threshold but greater than the second threshold in step 411, the base station selects an STC BF (2+2) technique as an antenna transmission method in step 413. The base station operates a beamforming coefficient using the estimated channel value and applies the operated beamforming coefficient to a data stream to be transmitted in step 415, and transmits the data stream using the selected antenna transmission method in step 409.

In contrast, when the velocity of the terminal is not greater than even the second threshold in step 411, the base station selects an STC BF (4+4) technique provided by an embodiment of the present invention as an antenna transmission method in step 417. The base station operates a beamforming coefficient using the estimated channel value and applies the operated beamforming coefficient to a data stream to be transmitted in step 415, and transmits the data stream using the selected antenna transmission method in step 409.

After that, the base station ends the algorithm according to an embodiment of the present invention.

As described above, an embodiment of the present invention generalizes a (2+2) structure of the conventional STC BF technique to an (N+N) structure in a wireless communication system to provide an improved STC BF technique, performs beamforming on each of two data streams, for example, transmits the data stream via all of N antennas, and applies different stream Cyclic Delay Diversities (CDD) to the respective two data streams. Therefore, even when SISO BF data is transmitted using an STC BF technique of an (N+N) structure of an embodiment of the present invention, the same performance as that of the SISO BF technique can be obtained.

When an SISO data user and an MIMO data user exist simultaneously inside the same frame, an STC DownLink (DL) zone Information Element (IE) required for discriminating an SISO region for transmitting SISO data and an MIMO region for transmitting MIMO data is additionally used, and accordingly, an MAP overhead increases, so that an entire system performance deteriorates. In addition, discrimination between the SISO region and the MIMO region includes a symbol axis, and thus, granularity problem occurs during data allocation, so that system capacity reduction additionally occurs. In the case where an SISO data user and an MIMO data user exist simultaneously inside the same frame as described above, when an STC BF technique of an (N+N) structure provided by an embodiment of the present invention is used, SISO data can be transmitted via an MIMO region, so that the overhead problem caused by use of the STC DL zone IE required for discriminating between an SISO region and an MIMO region does not occur, and thus, a system capacity may be increased.

In addition, an embodiment of the present invention provides an advantage of efficiently performing beamforming without performance deterioration even under a mobile channel environment by variably selecting an antenna transmission method and variably applying a beamforming coefficient depending on a velocity of a terminal in a wireless communication system.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A transmission method of a base station, the method comprising the steps of:
    mapping two data streams to each of all of 2N transmission antennas;
    multiplying the two data streams by different Cyclic Delay Diversity (CDD) phase sequences;
    adding the two data streams multiplied by the different CDD phase sequences for each transmission antenna; and
    multiplying the added data stream by a beamforming coefficient and transmitting the result for each transmission antenna.

2. The method of claim 1, wherein mapping the two data streams comprises mapping a first data stream of the two data streams to all the 2N transmission antennas, and mapping a second data stream of the two data streams to all the 2N transmission antennas.

3. The method of claim 1, further comprising:
    estimating a velocity of a terminal; and
    comparing the estimated velocity of the terminal with a second threshold,
    wherein when the estimated velocity of the terminal is not greater than the second threshold, each of the mapping of the two data streams, the multiplying of the two data streams by the different CDD phase sequences, the adding of the two data streams, and the transmitting are performed.

4. The method of claim 3, further comprising:
    when the estimated velocity of the terminal is greater than the second threshold, mapping a first data stream of the two data streams to N transmission antennas of the 2N transmission antennas, and mapping a second data stream of the two data stream to the other N transmission antennas of the 2N transmission antennas;
    multiplying the two data streams by the different CDD phase sequences; and
    multiplying a data stream mapped to a relevant transmission antenna by a beamforming coefficient for each transmission antenna, and transmitting the result.

5. The method of claim 3, further comprising:
    when the estimated velocity of the terminal is greater than a first threshold set to a value greater than the second threshold, mapping a first data stream of the two data streams to N transmission antennas of the 2N transmission antennas, and mapping a second data stream of the two data streams to the other N transmission antennas of the 2N transmission antennas; and
    transmitting a data stream mapped to a relevant transmission antenna without multiplying the data stream by a beamforming coefficient for each transmission antenna.

6. The method of claim 1, further comprising:
    estimating a channel of a terminal; and
    determining the beamforming coefficient using the estimated channel value.

7. The method of claim 1, wherein the base station simultaneously supports a Space-Time Coding (STC) technique and a beamforming technique.

8. A transmission apparatus of a base station, the apparatus comprising:
    a scheduler for mapping two data streams to each of all of 2N transmission antennas;
    a Cyclic Delay Diversity (CDD) phase sequence multiplier for multiplying the two data streams by different CDD phase sequences;
    an adder for each transmission antenna, for adding the two data streams multiplied by the different CDD phase sequences for each transmission antenna; and
    a beamforming coefficient multiplier for each transmission antenna, for multiplying the added data stream by a beamforming coefficient and transmitting the result for each transmission antenna.

9. The apparatus of claim 8, wherein the scheduler maps a first data stream of the two data streams to all the 2N transmission antennas, and maps a second data stream of the two data streams to all the 2N transmission antennas.

10. The apparatus of claim 8, further comprising:
a switch located between the CDD phase sequence multiplier and the adder at each of first N transmission antenna paths of 2N transmission antennas, for switching a first data stream of the two data streams, from the relevant CDD phase sequence multiplier to the relevant adder under control of the scheduler, and located between the CDD phase sequence multiplier and the adder at each of second N transmission antenna paths, different from the first N transmission paths, of the 2N transmission antennas, for switching a second data stream of the two data streams, from the relevant CDD phase sequence multiplier to the relevant adder under control of the scheduler; and
a velocity estimator for estimating a velocity of a terminal, wherein the scheduler compares the estimated velocity of the terminal with a second threshold, and when the estimated movement velocity of the terminal is not greater than the second threshold, maps the two data streams to the 2N transmission antennas, and turns on the switches.

11. The apparatus of claim 10, wherein when the estimated movement velocity of the terminal is greater than the second threshold, the scheduler maps the first data stream of the two data streams to first N transmission antennas of the 2N transmission antennas, maps the second data stream of the two data streams to second N transmission antennas, different from the first N transmission antennas, of the 2N transmission antennas, and turns off the switches.

12. The apparatus of claim 10, wherein when the estimated velocity of the terminal is greater than a first threshold set to a value greater than the second threshold, the scheduler maps the first data stream of the two data streams to first N transmission antennas of the 2N transmission antennas, maps the second data stream of the two data streams to second N transmission antennas, different from the first N transmission antennas, of the 2N transmission antennas, and controls not to operate the beamforming coefficient multiplier.

13. The apparatus of claim 8, further comprising:
a channel estimator for estimating a channel of a terminal; and
a beamforming coefficient operator for determining the beamforming coefficient using the estimated channel value.

14. The apparatus of claim 8, wherein the base station simultaneously supports a Space-Time Coding (STC) technique and a beamforming technique.

* * * * *